3,511,637
OIL-SOLUBLE HERBICIDAL ESTER-AMIDES AND HERBICIDAL COMPOSITIONS THEREOF
Arthur E. Pflaumer, P.O. Box 309, Norristown, Pa. 15165
No Drawing. Filed Sept. 29, 1964, Ser. No. 400,202
Int. Cl. A01n 9/20
U.S. Cl. 71—106   9 Claims

ABSTRACT OF THE DISCLOSURE

Water-insoluble, oil-soluble ester-amides of herbicidal monocarboxylic acids, e.g., the trichlorophenoxy acetic acid ester of N-2-hydroxyethyl oleyl amide, are found to be soluble in low cost organic solvents, e.g., diesel fuel, in large amounts to give clear solutions containing a high concentration of active herbicidal material and capable of being emulsified by mixture with water to form water-in-oil emulsions useful in the sling-spray method of herbicide application.

CROSS-REFERENCE TO RELATED APPLICATIONS

Reference is made under the provisions of 35 USC 120 to related applications Ser. No. 204,063, filed June 21, 1962, and now U.S. 3,206,485, and Ser. No. 311,647, filed Sept. 26, 1963, and now U.S. 3,282,673.

BACKGROUND OF THE INVENTION

Field of the invention

Herbicides constitute an important commercial commodity and are currently used in large quantities for the eradication of weeds and other control of vegetation. Although the use of herbicides for eradication of weeds has been known for over a century, herbicidal compositions did not attain great commercial importance until the discovery of auxin-type herbicides based upon aryl monocarboxylic acids. Such herbicidal acids are selective in their activity and may be used to control growth of weeds in cereal grains without substantial damage to the desired economic crops. Also, the more potent forms of the acids can be used to eradicate most of the vegetation within a given area, such as in clearing the sides of highways or railroad right-of-ways.

The use of herbicidal organic acids as vegetation control materials has presented some serious problems. For example, the herbicidal acids are not soluble in water nor other available inexpensive solvents. Since it is necessary to use these acids in some diluted form in order to permit their proper application over a growth area, it has been necessary to try to use derivatives of the acids so as to obtain solubility or dispersibility in water or other solvents. Many forms of esters, complex salts and other derivatives of herbicidal acids have been formed and tested for their herbicidal properties and feasibility of use on a commercial scale for the control of vegetation. Many derivatives of the herbicidal acids have been produced which possess very attractive solubility properties, but when used in the field, have been found to be unsatisfactory because of a tendency to "drift." This term is used in the trade to describe the property of certain derivatives of herbicides to cause detrimental results upon vegetation growing adjacent to the area of application of the herbicidal derivative, apparently due either to partial vaporization of the herbicidal agent after application or spreading to the adjacent area during the application. Ideally, a good herbicidal agent should be capable of being compounded into a concentrated form which will exhibit good shelf life, i.e., will not decompose or otherwise disintegrate during storage, so that the herbicidal product will require a minimum of storage space. Also, a good herbicidal material should be capable of being easily mixed with some diluent in the field to form a diluted material which can be spread over the growth area in a restricted manner so that it does not come in contact or "drift" to adjacent areas. Finally, the herbicidal material should not be water-soluble or be readily transformed after application to vegetation into a water-soluble form so that it will be easily removed in the event of rain.

A great variety of derivatives of herbicidal acids have been prepared and field tested in the past. Most of these have been discarded for one reason or the other, but enough different forms of the herbicides are made and sold commercially to require the agricultural industry and others concerned with maintaining specifications on these products to develop a standard term for designating herbicidally active content of such materials. The term employed is the "pound-gallon" which means the amount of actual herbicidal acid or a quantity of agent necessary to provide the equivalent thereof present in a particular composition. For example, a "two pound-gallon" means a herbicidal composition which contains two pounds of herbicidal monocarboxylic acid or the larger quantity of a derivative of the acid necessary to provide the equivalent of two pounds of the acid in each gallon of the composition. Advantageously, a herbicidal concentrate will possess as high a "pound-gallon" value as possible.

In order to reduce the cost of herbicidal compositions as low as possible, readily available and cheap solvents are used in their preparation. Diesel fuel or equivalent inexpensive organic solvents are used. Consequently, a herbicidal product which is to be sold in large quantities today should possess relatively good solubility in diesel fuel or similar low cost organic solvents.

Another factor currently influencing the herbicidal market is the use of emulsions for applying the herbicides in large scale quantities. In order to reduce the possibility of herbicidal materials being blown or carried by the wind from the area of application to some adjacent area, herbicidal compositions are now extensively formed into water-in-oil emulsions which have their water-to-oil ratio adjusted to produce an emulsion with high viscosity, e.g., a consistency similar to salad dressing or mayonnaise. Such emulsions can be dispersed upon vegetated areas by dropping or projecting the emulsion onto a rotating disc at high speeds. This sling-spray method of spreading permits a closer control of the area covered by the herbicide and is accepted in political areas which have outlawed other forms of spraying or application of the herbicides because of the drifting problem.

DESCRIPTION OF THE PRIOR ART

Esters, amides and amine salts of herbicidal acids such as the polyhalophenoxyacetic acids, have been given close attention in the development and commercialization of herbicides. The following is an outline of various forms of such materials which have been disclosed in United States patents:

Dosser et al., U.S. 2,590,815.—Water-soluble alkanolamine salts of the general formula:

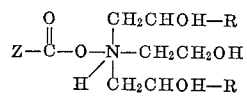

wherein:

Z is the aryloxy alkyl moiety of a herbicidal aryloxy alkane monocarboxylic acid, and
R is lower alkyl.

De Atley et al., U.S. 2,771,477.—Oil-soluble alkanol-amine esters of the general formula:

$$Z-\overset{O}{\underset{\|}{C}}-O-R'-\underset{|}{\overset{R'-O-Q}{N}}$$
$$R'-O-Q$$

wherein:

Z is the aryloxy moiety of a herbicidal aryloxy alkane monocarboxylic acid,
Q is hydrogen, —CO—R, or —CO—Z, and
R is lower alkyl.

Brugmann et al., U.S. 2,876,089.—Oxo alcohol esters of the general formula:

$$Z-\overset{O}{\underset{\|}{C}}-O-R$$

wherein:

Z is the aryloxy alkyl moiety of a herbicidal aryloxy alkane monocarboxylic acid, and
R is the alkyl moiety of an oxo alcohol.

Harwood et al., U.S. 2,900,411.—Water-insoluble fatty amine salts of the general formula:

$$Z-\overset{O}{\underset{\|}{C}}-O-\underset{\underset{H}{\diagdown}\ \underset{H}{\diagup}}{\overset{H}{\underset{|}{H}}}-R$$

wherein:

Z is the acyl moiety of a plant hormone monocarboxylic acid, and
R is an alkyl radical of at least 6 carbon atoms.

Pflaumer, U.S. 3,093,471.—Oil-soluble esterified alkanolamine salts of the general formula:

$$Z-\overset{O}{\underset{\|}{C}}-O-\underset{\underset{H}{\diagdown}\ \underset{R}{\diagup}}{\overset{R}{\underset{|}{N}}}-R'-O-\overset{O}{\underset{\|}{C}}-R''$$

wherein:

Z is the acyl moiety of a herbicidal aryl monocarboxylic acid,
R' is an alkylene radical,
R" is an alkyl radical of 6-19 carbon atoms, and
R is hydrogen, alkyl, hydroxy alkyl or —R'OOCR".

Although many such forms of herbicidal acid esters, amine salts or amides possess attractive solubility properties, they fail, because of one or more reasons, to be useable on a commercial scale as herbicides. For example, many such products decompose during storage when dissolved in a solvent or in contact with water to produce unuseable products. Other forms of such herbicidal materials may not have sufficient solubility to produce concentrates of an acceptably high pound-gallon rating. Still other such esters or salts which may seem attractive from the solubility or concentration viewpoint, are unuseable because of the inability of the herbicidal material to be emulsified with water to form an emulsion which will be stable long enough to permit practical use of the emulsion in the field, e.g., stability of at least one day after mixing. Finally, even though some of the herbicidal esters, amides or salts will pass the stability, emulsifiability and pound-gallon restrictions, they may be unattractive because of "drifting" problems.

OBJECTS

Principal objects of this invention are the provision of new improvements in herbicidal compositions which contain a high active herbicidal content and the provision of new methods for making such improved herbicides. Further objects include:

(1) The provision of oil-soluble derivatives of herbicidal aryl monocarboxylic acids which possess good stability and which are not easily hydrolyzed in the presence of strong acids, e.g., trichlorophenoxy acetic acid.

(2) The provision of herbicidal agents, derived from herbicidal monocarboxylic acids, which possess an excellent combination of properties for use of the agents on a commercial scale for eradication of weeds and other control of vegetation, including high solubility in inexpensive hydrocarbon solvents, substantial freedom from "drift" problems, a high equivalency of herbicidal acid and the ability to be readily emulsified or dispersed in aqueous systems.

(3) The provision of new water-insoluble, oil-soluble ester-amides of herbicidal monocarboxylic acids.

(4) The provision of herbicidal ester-amides that may be dissolved in diesel fuel or other low cost organic solvents to give clear solutions containing a relatively high degree of active herbicidal material, e.g., at least a two pound-gallon.

(5) The provision of herbicidal emulsions that can be made and used at very low cost relative to their active herbicidal content because they can be formulated with inexpensive solvents and without need for expensive emulsifiers or other dispersing agents or additives.

(6) The provision of herbicidal concentrates in which the herbicidal material is present as an ester-amide that functions as a solvating agent for herbicidal monocarboxylic acids, and as an emulsifying agent to aid in the formation of water-in-oil emulsions of the herbicidal agent.

(7) The provision of new methods for making valuable herbicidal compositions from relatively inexpensive, readily available reagents.

(8) The provision of methods of forming herbicidal ester-amides from herbicidal monocarboxylic acids, hydroxy amines and fatty acids.

(9) The provision of ester-amides of herbicidal acids which act as solvating agents or solvents for the herbicidal acids from which they are formed, thereby making it possible to create liquid herbicidal compositions containing a relatively very high amount of active herbicidal acid.

Other objects and further scope of applicability of the present invention will become apparent from the detailed description given hereinafter; it should be understood, however, that the detailed description and specific examples, while indicating preferred embodiments of the invention, are given by way of illustration only.

GENERAL DESCRIPTION

These objects are accomplished according to the present invention by formation of herbicidal ester-amides of the following general formula:

$$R_1CO-\underset{|}{\overset{R_5}{N}}-\underset{|}{\overset{R_3}{C}}-R_2-O-R_6$$
$$R_4$$

wherein:

$R_1$ is a radical of the group $R_a$, $R_b$, $R_c$ and $R_h$;
$R_a$ is an 11 to 19 carbon atom alkyl radical;
$R_b$ is a 6 to 16 carbon atom aryl radical;
$R_c$ is a 6 to 16 carbon atom cycloalkyl radical;
$R_h$ is the aryl, aryloxyalkyl or aralkyl moiety of a herbicidal aryl, aryloxyalkyl or aralkyl monocarboxylic acid, particularly a herbicidal polyhaloaryl or polyhaloaryloxyalkyl monocarboxylic acid;
$R_2$ is a divalent radical selected from the group consisting of —R"—, —R"—(O—R")$_n$— and $$-R''-(N-R'')_n-$$
$$\underset{|}{R_7}$$

R" is 1 to 5 carbon alkylene,
n is a positive integer from 1 to 10,
$R_3$, $R_4$, $R_5$ and $R_7$ are hydrogen, 1 to 6 carbon alkyl, —R"OH, —R"—O—$R_a$, or R"—O—$R_h$, and
$R_6$ is a radical of the group $R_a$, $R_b$ and $R_c$ when $R_1$ is $R_h$ or $R_6$ is $R_h$ when $R_1$ is $R_a$, $R_b$ or $R_c$.

Advantageously, the ester-amides are formed from a herbicidal polyhaloaryloxy alkane monocarboxylic acid and a fatty acid of 12 to 20 carbon atoms. Preferably, the amide moiety is formed from the fatty acid and the ester moiety from the herbicidal acid.

Ester-amides having a preferred combination of properties for use as herbicides in accordance with the invention have the following formulae:

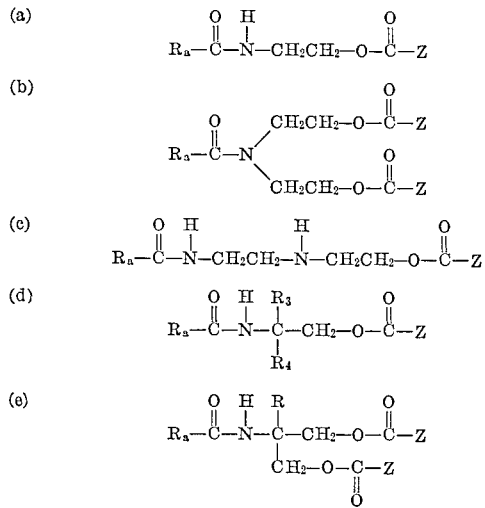

wherein:

Z is a polyhalophenoxy methylene radical,
R is lower alkyl, viz, 1 to 6 carbon alkyl, and
$R_a$, $R_3$ and $R_4$ have the meaning defined hereinbefore.

The objects are further accomplished in accordance with the invention by the formation of the ester-amides of the class hereinbefore defined by reaction of a monocarboxylic acid with a hydroxy amine to form the corresponding amide and then the reaction of the resulting amide with a different monocarboxylic acid to esterify a hydroxy group contained in the amide. Advantageously, the herbicidal acid is used to form the ester groups in the ester-amides and a hydrocarbon monocarboxylic acid is used to form the amide group. Particularly attractive results are obtained if the amide group is formed from a fatty acid containing 12 to 20 carbon atoms, but aryl monocarboxylic acids containing 7 to 17 carbon atoms and cycloalkyl monocarboxylic acids containing 7 to 17 carbon atoms may be employed. With some hydroxy amines or fatty acids or herbicidal monocarboxylic acids, solid products will be formed and in other cases liquid reaction products are obtained. Either type of product is useable in forming herbicidal concentrate in accordance with the invention, but liquid materials are preferred, especially if the products are to be stored or handled under frigid conditions where solidification or separation may be prompted by the low ambient temperature.

The success of the present invention is due, in part, to the discovery that the ester-amides of the invention are highly resistant to hydrolysis even on long periods of storage at varying temperatures and in the presence of strong acids. This is an important feature because, as previously indicated, many related herbicidal agents of the prior art have been prone to hydrolyze quickly in the presence of strong acids.

The success of this invention is also due, in part, to the discovery that the new ester-amides possess a solvating property for the free herbicidal acids of which the ester-amide is formed, thus making it possible to effectively increase the pound-gallon rating of a herbicidal concentrate by dissolving additional free herbicidal acid in the solution of the ester-amide in diesel fuel or other cheap organic solvent. When such procedure is attempted with many products of the prior art, intolerable hydrolysis of the prior art product results when it is contacted with acid after being stored only a short time.

An additional discovery of this invention is that herbicidal agents of the class as defined are substantially free of any "drifting" onto adjacent areas of vegetation when applied for the control of weeds or other flora.

Yet another discovery of the invention is that the herbicidal ester-amides possess a dispersing or emulsifying property toward the formation of water-in-oil emulsions when water is mixed with a fuel oil solution or other cheap organic solvent solution of the ester-amide. This makes these products particularly attractive for use in the sling-spray method of application mentioned above.

EXAMPLES

A more complete understanding of the new herbicidal ester-amides, herbicidal concentrates and compositions thereof and methods for preparing such materials may be had by reference to the following examples in which all parts and percentages are by weight unless otherwise specified.

EXAMPLE 1

There were charged into a flask equipped with a column for distilling off water, a propeller-type agitator and a thermometer, 256 parts of trichlorophenoxyacetic acid, 61 parts of monoethanolamine and 300 parts of tall oil fatty acid. In addition, 200 parts of "Reprol 300" were added. ("Reprol 300" is a closely cut petroleum solvent.) This solvent was used to facilitate agitation and to help carry over the water of esterification and amidation.

The contents of the flask were slowly heated and at 160° C. water started distilling over. At this temperature, the contents of the flask was a clear homogeneous solution. The temperature was slowly raised to 225° C. until no more water distilled over. Approximately 36 parts of water were collected. A clear brown liquid product was obtained which, at 150° C., was completely miscible with diesel fuel.

EXAMPLE 2

Into the equipment described in Example 1, there were charged 105 parts of diethanolamine, 285 parts of tall oil fatty acid, 256 parts of trichlorophenoxyacetic acid, and 300 parts of "Reprol 300." On heating, the mixture became clear at 140° C. and at 160° C., water distilled over. The temperature was raised to 200° C. and a total of 36 parts of water were moved.

On cooling to room temperature, the product was a dark viscous liquid. When it was dissolved in an equal volume of diesel fuel and four volumes of water was agitated with the solution, an excellent water-in-oil emulsion was obtained. The product was soluble in diesel fuel over a wide range. Field tests showed the product to have good herbicidal properties and complete freedom from "drifting" problems.

EXAMPLE 3

Into the equipment described in Example 1, there were charged 133 parts of "Amine AX," 300 parts of tall oil fatty acid, 256 parts of trichlorophenoxyacetic acid (1 mol) and 200 parts of "Reprol 300." ("Amine AX" is a mixture of hydroxy amines made by the reduction of nitroparaffins.) The mixture cleared at 150° C. at which temperature water started distilling over. At 165° C., 2 mols of water were removed. The product was a clear liquid at room temperature. With an equal volume of diesel fuel, it formed a clear solution and, on the addition of water with agitation, a water-in-oil emulsion. The emulsion was applied by the "sling-spray" method in the control of weeds along railroads with very favorable results.

EXAMPLE 4

Into a flask equipped as described in Example 1, there were charged 87 parts of 2-amino-2-methyl-1-propanol, 256 parts of trichlorophenoxyacetic acid, 300 parts of tall oil fatty acid and 200 parts of "Reprol 300." The slush cleared at 145° C. and water distilled off. At 215° C. 36 parts of water had distilled over. The product was miscible with 2 volumes of diesel fuel and gave a water-in-oil emulsion on the addition of water with agitation. The same diesel fuel solution to which 2% of an alkyl phenyl alkylene glycol ether surfactant was added could be poured into water to give an oil in water emulsion with very little agitation.

Chemically, this product is the amide of the herbicidal acid and the ester of the fatty acid of 2-amino-2-methyl-1-propanol dissolved in "Reprol 300." Seventy-five parts of this solution will dissolve 25 parts of free herbicidal acid, e.g., trichlorophenoxyacetic acid. This solution of free herbicidal acid is soluble in diesel fuel. In a particular case, one part of the herbicidal solution was dissolved in three parts of diesel fuel. The diesel fuel solution, on addition of water with agitation, gave a water-in-oil emulsion. On the addition of a water-soluble emulsifying agent to the diesel fuel solution, an oil-in-water emulsion was obtained.

EXAMPLE 5

The following reagents were employed in the quantities indicated:

oleic acid—1 mol
monoethanolamine—1 mol
trichlorophenoxyacetic acid—1 mol
paraffinic petroleum solvent—200 grams The oleic acid and the amine were charged into a three-necked flask equipped with motor-driven stirrer, thermometer and distillation column with water-trap reflux unit. The contents of the flask were gradually heated to 185° C. and then maintained at this temperature while one mol of water was collected in the reflux trap. This produced a product containing about 80% of fatty acid amide and 20% fatty acid ester according to the following equation:

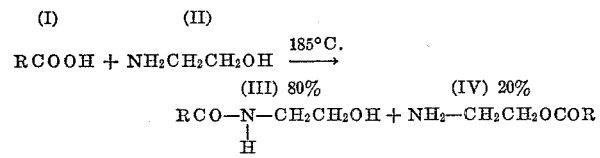

The TCPA acid was then added to the reaction product and the mixture was heated to 215° C. The temperature was held at this level while 1 mol of water was drawn off in the reflux trap. The resulting product was a mixed ester-amide composed approximately of 80% of ester-fatty amide and 20% of the fatty ester-amide according to the equation:

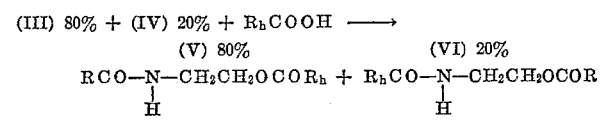

The ten parts of the mixed ester-amide easily dissolved at room temperature in ten parts of diesel fuel. When the esteramide was separated by steam distillation from the petroleum solvent, it was a dark brown clear liquid at 15–20° C.

A solution of equal parts of the ester-amide in diesel fuel readily mixed with three volumes of water to give a W/O emulsion of extremely high viscosity. The emulsion was shown by field tests to have excellent herbicidal properties and to be useable for application by the sling-spray method.

In another case, the TCPA acid was first reacted with the monoethanolamine and then the fatty acid was subsequently reacted after the elimination of one mol of water. The resulting product was found to have a lower degree of solubility in diesel fuel.

In still another case, the TCPA acid and the oleic acid were added together and two mols of water were removed at 185°–215° C. This product also had lower solubility in diesel fuel than the ester-amide prepared in accordance with the equations.

EXAMPLE 6

The general procedure of Example 5 was repeated seven additional times with the following hydroxy amines being substituted for monoethanolamine:

(a) N-2-hydroxyethyl ethylenediamine
(b) N,N'-bis(2-hydroxyethyl) ethylenediamine
(c) 2-amino, 2-methyl propanol-1
(d) 2-amino, 2-methyl propanediol-1,3
(e) 2-amino, 2-ethyl propanediol-1,3
(f) tris (hydroxymethyl) amino methane
(g) N-2-hydroxyethyl benzyl amine.

In each case, a clear liquid product, brown in color, comprising an ester-amide dissolved in hydrocarbon solvent was obtained. The products were all soluble in at least equal parts of diesel fuel and all exhibited good herbicidal properties in field tests.

In another case, the general procedure of Example 5 was repeated with the listed hydroxyamines b, d, e and f with the exception that 2 mols of TCPA acid were used in place of 1 mol. Again, products soluble in diesel fuel and exhibiting good herbicidal properties were obtained.

EXAMPLE 7

The procedure of Example 5 was repeated using soya bean oil in place of oleic acid. The resulting product was soluble in an equal volume in diesel fuel and formed a good W/O emulsion when the diesel fuel solution was agitated with 3 volumes of water. When diethanolamine was substituted for monoethanolamine along with 2 mols of TCPA acid instead of one, the resulting fatty acid amide-diester of TCPA acid was not soluble in an equal volume of diesel fuel, but 25 parts of "Reprol 300" were compatible with 75 parts of the diester. Also, the diester did not exhibit as good W/O emulsifying properties as the monoester of monoethanolamine.

In the above examples, where the fatty acid and the phenoxyacetic acid are simultaneously reacted with the amine, the herbicidal acid, because of its reactivity, forms the amide and the fatty acid which is left esterifies the only hydroxyl groups. One mol of water comes off at a lower temperature than is required for the second mol. Therefore, if one wishes to place the fatty group in the amide position, the following method may be used: The methyl ester of the fatty acid is heated with diethanolamine until the methyl alcohol completely distills over. The product is predominately the fatty amide of diethanolamine. This, then, is esterified with the herbicidal acid.

DISCUSSION OF DETAILS

It will be apparent from the foregoing general description and examples that there are a wide variety of hydroxyamines, herbicidal acids and other monocarboxylic acids that may be used as reagents in producing the new herbicidal compositions of the invention. The general scope of the reagents is prescribed by the definition of the classes of useable materials as stated under the general description hereinbefore. However, certain specific compounds and subclasses of compounds produce particularly good results and are preferred.

Examples of hydroxyamines which may be advantageously used in forming the new herbicidal compositions include: monoethanolamine; diethanolamine; N-ethanol ethylenediamine; N,N'-diethanol ethylenediamine; $N_1$, $N_3$-diethanol diethylene triamine; 2-amino, 2-methyl propanol-1; 2-amino, 2-methyl propanediol-1,3; 2-amino, 2-ethyl propanediol-1,3; tris(hydroxymethyl) amino methane; N-ethanol dicyclohexylene triamine; N-5-hydroxy cyclohexyl ethylenediamine; N-ethanol p-phenylene diamine; N-2-hydroxy cyclohexyl cyclohexylene diamine; N-phenyl, N-hydroxy ethylamine; N-xylyl, N'-hexyl, N'-hydroxyethyl ethylenediamine; N,N-bis(hydroxyethyl) ethylenediamine; N-p-cuminyl, N'-3-hydroxybutyl ethylenediamine; ethanol phenylamine; 2-methylol hexylamine; N-ethanol, 2-hydroxy ethoxy ethylamine, and related hydroxyamines, including commercially available mixtures of hydroxyamines.

Examples of the monocarboxylic acids having no herbicidal properties and, particularly hydrocarbon monocarboxylic acids, which may be advantageously used in forming the new esteramides of the invention include: oleic, stearic, palmitic, myristic, abietic, toluic, benzoic, naphthenic, hexahydronaphthenic, dihydrobenzoic, lauric, phenylacetic acids and commercial mixtures of these or similar acids, e.g., tall oil acids, rosin acids, naphthenic acids, neo acids made by the Koch process and the like.

Mixtures of two or more of the foregoing acids may be used to react with individual hydroxyamines or mixtures of hydroxyamines in accordance with the invention. As a practical matter, and as indicated by the foregoing examples, mixtures of the reagents will normally be employed since these constitute the inexpensive forms of materials readily available as commercial products. As is further apparent from the foregoing examples, the monocarboxylic acids may be reacted with the hydroxyamines as free acids or in the form of esters such as the glycerine esters which are available as vegetable oils, or the like. Using the esters, the amidation or transesterification will occur with a corresponding elimination of an alcohol instead of water of reaction.

Various herbicidal acids may be reacted with the hydroxyamines to form the herbicidal ester-amides, but aryloxyalkane monocarboxylic acids are preferred. Specific examples of herbicidal acids which may advantageously be used are: 2,4-dichlorophenoxyacetic; 2,4,5-trichlorophenoxyacetic; phenoxyacetic; 1-naphthoxyacetic; 2-naphthoxyacetic; 4-chlorophenoxyacetic; 4-chlorophenoxypropionic; alpha-(2,4-dichlorophenoxy) caproic; di-(4-chlorophenoxy) acetic; 4-bromophenoxyacetic; 4-fluorophenoxyacetic; 2-chlor,4-bromophenoxyacetic; 2-methyl, 4-chlophenoxyacetic; 2,5-diethyl, 4-chlorophenoxyacetic; 5,7 - dichloro-alpha-naphthoxyacetic; 2,4 - dimethylphenoxyacetic and other herbicidal haloaryloxy monocarboxylic acids, e.g., those mentioned in U.S. 2,446,836. Mixtures of 2 or more of these acids may be used to form the ester-amides with the hydroxyamine compounds.

Conditions used in forming the amides and then the ester-amides of the invention may be varied. The temperatures used for the reaction should be sufficiently high to make the reactions proceed at a reasonable rate but to not be so high as to cause decomposition of reagents or undesirable side reactions. Temperatures advantageously used will be between 100° and 300° C. and advantageously between 180 and 230° C. Within this latter preferred range, the resulting reaction products have a sufficiently low viscosity so that the mixture is fluid enough to be properly agitated.

In forming the herbicidal ester-amides, 1 mol of the herbicidal acid or hydrocarbon acid may react with each amino or hydroxy group present in the hydroxyamine compound. This can be two mols of acid per mol of hydroxyamine compound or the ratio may be greater as with a hydroxy polyalkylene polyamine or polyhydroxyamine. Further, the full stoichiometric proportion of herbicidal acid need not be used, in which case a mixture of the amide and ester-amide may be obtained. On the other hand, since the ester-amide acts as a solvent for the herbicidal acid, more than the full stoichiometric proportion may be used, in which case a solution of the acid acid in the salt may be obtained. As a general rule, between about 0.5 to 3 mols of herbicidal acid per fatty acid amide or other amide can be used and advantageously 0.8 to 2 mols per hydroxy group in the amide are employed. Normally the higher mol ratios are preferred since this forms products having desirable high active herbicide content. The more herbicidal acid in the product and the less proportion of ester-amide, the more potent the resulting herbicidal composition per unit cost of ingredients.

The new herbicidal ester-amides with added herbicidal acid dissolved therein are soluble in a wide variety of readily available, inexpensive solvents, e.g., liquid hydrocarbons. Commercial hydrocarbon solvents having a boiling range, e.g., 165°–300° C., and an initial boiling point of about 100° C. are preferred so that use of highly volatile solvents which may present a fire hazard will be avoided. The herbicidal ester-amide can be dissolved in diesel fuel, kerosene, methyl naphthalene, fuel oil, turpentine, xylene, Stoddard solvent, V.M. & P. naphtha, chlorinated kerosene and the like. Even lower boiling liquid hydrocarbons can be used if desired. Extremely high boiling solvents, e.g., final boiling point of 400° C., may be used since the evaporation of the solvent after application does not appear necessary for effective use of the herbicide.

Such solutions can be used directly as herbicides for application to vegetated areas to control plant growth. Accordingly, the proportion of active herbicidal product relative to the solvent may be varied and will depend to some extent upon the particular manner in which the herbicidal composition is to be employed. Where a concentrate consisting of a solution of the herbicidal product in a solvent is desired for mixing with water or additional solvent in the field at the point of use, solutions containing between about 1 and 5 lbs. of herbicidal product dissolved in each gallon of solution are recommended.

The preferred herbicidal concentrates of this invention are completely soluble in kerosene and solutions in kerosene can be used without resort to emulsification. Alternatively, the herbicidal ester-amides may be emulsified, without any added kerosene, to give good W/O emulsions. The herbicidal ester-amides may also be formed into O/W emulsions using suitable emulsifying agents, with or without added inert solvents.

The herbicidal ester-amides of this invention may be mixed with other herbicidal products if desired for the preparation of special formulations. For example, solutions of these salts in suitable solvents may contain herbicidal esters such as the alkanol esters, glycol esters, or other esters of 2,4-D and 2,4,5-T. Such special formulations may also include, if desired, surface active agents, spreading agents, photochemical catalysts (see U.S. 2,446,836) or the like.

The new herbicidal compositions may be applied to vegetated areas in any suitable fashion known to the art. This includes application by misting, spraying, dusting or the like. However, as previously indicated, the new herbicidal concentrates are especially effective for the production of water-in-oil emulsions which may be applied with sling-spray dispersing equipment designed to distribute the herbicidal emulsion as large drops which cannot be easily spread by air currents to adjacent areas. Emulsions containing 5 to 15 gallons of water per gallon of herbicidal concentrate, as previously described, have been found particularly satisfactory.

CONCLUSION

As a result of the invention described herein, there are provided new herbicidal compositions which contain herbicidal acids, particularly aryloxyalkane carboxylic acids, as the effective herbicidal ingredient. These improvements in herbicidal compositions are founded upon the discovery of some new herbicidal ester-amides formed from certain hydroxyamine compounds containing salt-forming amino groups and the herbicidal acids and also upon the discovery of the solubilizing effect of certain amides upon herbicidal acids. Thus, not only are these ester-amides soluble in low cost hydrocarbon solvents even in concentrated amounts at all temperatures above their liquefication points, but also they have the ability to dissolve or solubilize very substantial quantities of the herbicidal acids. The resulting herbicidal compositions contain herbicidal agents which are of low volatility that may be applied to vegetated areas without creating problems of "drifting" to adjacent areas. Consequently, the invention provides a practical solution to the problem of continued use of herbicides derived from aryloxyalkane carboxylic acids in those political subdivisions where legislation has been passed prohibiting the use of esters of these herbicidal acids or other herbicides which are not free of drifting problems.

What is claimed and desired to be protected by Letters Patent is:

1. A herbicidal composition containing as an active herbicidal ingredient an ester-amide of monoethanolamine of the formula:

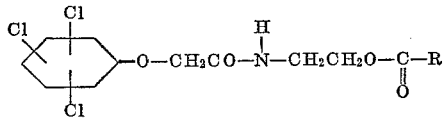

wherein R is the alkyl moiety of tall oil fatty acid.

2. A herbicidal composition containing as an active ingredient a 12 to 20 carbon atom fatty acid esterified ethanolamine amide of a chlorophenoxy acetic acid.

3. A herbicidal composition containing as an active herbicidal ingredient an ester-amide of monoethanolamine of the formula:

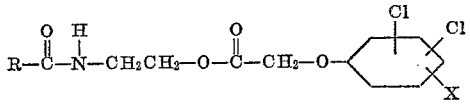

wherein:

R is 11 to 19 carbon atom alkyl radical, and
X is hydrogen or chlorine.

4. A herbicidal composition mixable with water to form a viscous water-in-oil emulsion which comprises a solution in diesel fuel of the trichlorophenoxyacetic acid ester or N'- 2-hydroxyethyl oleyl amide.

5. A herbicidal composition as claimed in claim 3 in the form of a liquid concentrate that may be mixed with water to form a viscous water-in-oil emulsion useable for herbicidal purposes which comprises:
(A) a 12 to 20 carbon atom fatty acid esterified alkanolamide of a herbicidal halophenoxyacetic acid of the formula defined in claim 3,
(B) free herbicidal halophenoxyacetic acid, and
(C) liquid hydrocarbon solvent of boiling range between about kerosene and diesel fuel,
(D) said components (A), (B) and (C) being in the form of a substantially clear solution, said components being present in the solution in parts by weight ratio A:B:C of between about 50:1:10 and 50:10:500.

6. A herbicidal composition as claimed in claim 3 mixable with water to form an emulsion useable for herbicidal purposes which comprises a mixture of:
(A) fatty acid esterified alkanolamine amide of herbicidal halophenoxyacetic acid, and
(B) free herbicidal halophenoxyacetic acid.

7. A herbicidal composition as claimed in claim 6 in the form of an emulsion containing as a disperse phase a liquid hydrocarbon solvent of boiling range between about kerosene and diesel fuel.

8. A herbicidal composition mixable with water to form a viscous water-in-oil emulsion which comprises a solution in diesel fuel of an ester-amide of the formula:

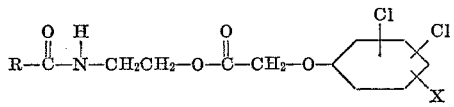

wherein:

R is 11 to 19 carbon atom alkyl radical, and
X is hydrogen or chlorine.

9. A herbicidal composition containing as an active herbicidal ingredient an ester-amide of a hydroxyamine of the formula:

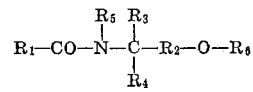

wherein:

$R_1$ is 11 to 19 carbon atom alkyl
$R_2$ is methylene, —$CH_2$—NH—$CH_2CH_2$— or

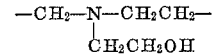

$R_3$ is methyl or hydrogen,
$R_4$ is hydroxymethyl or hydrogen, and
$R_6$ is polychlorophenoxyacetyl.

References Cited

UNITED STATES PATENTS

| | | | |
|---|---|---|---|
| 915,680 | 3/1909 | Kosters et al. | 260—404 |
| 3,093,471 | 6/1963 | Pflaumer | 260—404 X |
| 3,226,403 | 12/1965 | Magne et al. | 260—404 X |

OTHER REFERENCES

The Dow Chemical Co. "Alkanolamines Handbook," p. 30 (1964).

NICHOLAS S. RIZZO, Primary Examiner

R. V. RUSH, Assistant Examiner

U.S. Cl. X.R.

71—109, 110; 260—404, 404.5